(12) United States Patent
Belhumeur (10) Patent No.: US 6,372,128 B1
(45) Date of Patent: Apr. 16, 2002

(54) BIOFILTERING DEVICE FOR TREATING WASTEWATER

(75) Inventor: Albert Belhumeur, Orford (CA)

(73) Assignee: Le Group Berger Ltée/Berger Group Ltd., St. Modeste (CA)

(*) Notice: Subject to any disclaimer, the term of this patent is extended or adjusted under 35 U.S.C. 154(b) by 0 days.

(21) Appl. No.: 09/572,138

(22) Filed: May 16, 2000

(51) Int. Cl.[7] ................................................. C02F 3/00
(52) U.S. Cl. ........................ 210/137; 210/170; 210/456; 210/472
(58) Field of Search .................... 210/137, 151, 210/150, 170, 456, 472, 85, 617, 616, 602, 615, 97, 532.2

(56) References Cited

U.S. PATENT DOCUMENTS

| | | | |
|---|---|---|---|
| 1,805,852 A | | 5/1931 | Simpson |
| 4,104,166 A | * | 8/1978 | LaRaus |
| 4,119,273 A | | 10/1978 | Armstrong |
| 4,303,350 A | * | 12/1981 | Dix |
| 4,614,584 A | | 9/1986 | Di Duca |
| 5,206,206 A | | 4/1993 | Buelna et al. |
| 5,264,129 A | | 11/1993 | Simpson et al. |
| 5,322,629 A | | 6/1994 | Stewart |
| 5,453,182 A | | 9/1995 | Kikuta |
| 5,618,414 A | | 4/1997 | Goupil et al. |
| 5,690,827 A | | 11/1997 | Simmering et al. |
| 5,810,510 A | | 9/1998 | Urriola |
| 5,989,416 A | | 11/1999 | Gorton |

FOREIGN PATENT DOCUMENTS

| | | | |
|---|---|---|---|
| CH | | 637604 | 8/1983 |
| EP | | 382579 A1 | * 2/1989 |
| EP | | 0 630 860 | 12/1994 |
| WO | WO 94/13590 | | 6/1994 |

* cited by examiner

*Primary Examiner*—Joseph W. Drodge
*Assistant Examiner*—Terry K. Cecil
(74) *Attorney, Agent, or Firm*—Ogilvy Renault (57) ABSTRACT

A biofiltering device for treating wastewater comprises a housing having an inlet for receiving the wastewater to be treated and an outlet for discharging the treated wastewater, a bed of peat disposed inside the housing between the inlet and outlet, the peat defining a biofiltering medium having a predetermined biofiltering capacity, and an air vent for aerating the peat. The device further includes a fluid flow control system arranged over the bed of peat and in fluid flow communication with the inlet, for distributing the wastewater through the bed of peat in a manner such that when the wastewater enters the system at a flow rate greater than the biofiltering capacity of the peat, the wastewater discharged from the system flows through the bed of peat at a flow rate no greater than the biofiltering capacity. The biofiltering device according to the invention enables one to efficiently treat incoming wastewater irrespective of its flow rate.

29 Claims, 6 Drawing Sheets

BIOFILTERING DEVICE FOR TREATING WASTEWATER

BACKGROUND OF THE INVENTION

The present invention pertains to improvements in the field of wastewater treatment. More particularly, the invention relates to a biofiltering device for treating wastewater discharged from a septic tank.

Small wastewater treatment systems are typically designed so that raw wastewater generated by a residence is discharged directly into a septic tank. Once discharged into the septic tank, the effluent is allowed to partially settle and is then passed into a dosing chamber. From the dosing chamber, the effluent is fed into a filtering medium, e.g. a trickling bed filter, and then collected in a central drain pipe. Once the effluent is collected in the central drain pipe, it is then dispersed to a plurality of parallel drain pipes positioned generally equidistant from one another across a specified area underneath the ground. Each drain pipe has a plurality of orifices which allow the effluent to be released into the surrounding environment.

Various filtering media and devices have been proposed for treating the wastewater discharged from a septic tank. For example, U.S. Pat. No. 5,206,206 discloses the use of pre-treated peat in biofilters for wastewater treatment. The pre-treated peat comprises a mixture of pre-sieved peat with a Fe-containing compound and lime. A filter-bed constituted of a layer of such a pre-treated peat disposed between upper and lower layers of calcareous stones is arranged inside a filtration column. A rotary distribution system including a perforated arm is used for distributing the wastewater to be treated on top of the filter-bed. Since the pressure of the incoming wastewater serves to displace the perforated arm and the wastewater entering the distribution system contains suspended particles of organic and inorganic materials, the suspended particles often clog the rotation mechanism, thus rendering the distribution system inoperative.

U.S. Pat. No. 5,618,414 also discloses a wastewater treatment system utilizing peat as a filtering medium. Such a treatment system comprises a container having an upper portion, a lower portion, at least one waster water inlet in the upper portion of the container for receiving the wastewater, and an opening in the lower portion of the container for allowing the treated water to escape the container. At least one elongated hollow casing is mounted within the lower portion of the container. The casing has an open bottom surface and defines at least two treatment chambers within the container, each of the treatment chambers containing a bed of peat for treating the wastewater. At least one distribution means is also provided for distributing the wastewater entering the container through the wastewater inlet into at least one of the treatment chambers. Each distribution means comprises a water inlet pipe connected to the wastewater inlet and leading above the casing and a trough tiltably mounted on top of a corresponding casing. The trough extends along the casing and has two opposite sides. It defines at least one wastewater receiving means on one of the two sides and it is tiltable between a first position whereat the wastewater receiving means receives wastewater exiting the water inlet pipe and a second position whereat the wastewater received in the receiving means flows out of the same. The trough also has counterweight means on its other side for holding it in the first position while it is filled up and for bringing it back from the second position to the first position after the at least one wastewater receiving means has been emptied. In addition, at least one distribution plate is mounted above the bed of peat in one of the treatment chambers defined by the corresponding hollow casing. This at least one distribution plate comprises a plurality of channels projecting from the trough, each of the channels having an end for receiving wastewater flowing from the trough so that the wastewater is divided into a plurality of flows each flowing in a corresponding channel, each of the channels also having at least one opening for letting the wastewater drip into the corresponding treatment chamber.

The use of the aforesaid tiltable trough in combination with the distribution plate for distributing the wastewater over the bed of peat presents certain drawbacks. When the wastewater enters the container at a high flow rate and a large amount of wastewater is continuously received in the trough over a period of time, the trough rapidly tilts between the aforesaid first and second positions so that the wastewater flowing therefrom floods the channels defined in the distribution plate and flows over the edges of the distribution plate and onto the bed of peat. There is thus flooding of the bed of peat. Since any given peat has a predetermined biofiltering capacity over which the peat will not act as a biofiltering medium, flooding of the bed of peat will cause the wastewater to flow through the bed of peat at a flow rate greater than the biofiltering capacity of the peat, resulting in a non-efficient removal of both organic and inorganic materials.

SUMMARY OF THE INVENTION

It is therefore an object of the present invention to overcome the above drawbacks and to provide an improved biofiltering device which utilizes peat as biofiltering medium and which can efficiently treat wastewater irrespective of the flow rate thereof.

In accordance with the present invention, there is provided a biofiltering device for treating wastewater, comprising a housing having inlet means for receiving the wastewater to be treated and outlet means for discharging the treated wastewater, a bed of peat disposed inside the housing between the inlet and outlet means, the peat defining a biofiltering medium having a predetermined biofiltering capacity, and means for aerating the peat. The device according to the invention further includes a fluid flow control system arranged over the bed of peat and in fluid flow communication with the inlet means, for distributing the wastewater through the bed of peat in a manner such that when the wastewater enters the system at a flow rate greater than the biofitering capacity of the peat, the wastewater discharged from the system flows through the bed of peat at a flow rate no greater than the biofilteting capacity.

According, to a preferred embodiment of the invention, the fluid flow control system comprises a fluid flow control unit having a chamber of variable volume in fluid flow communication with the inlet means and a plurality of spaced-apart discharge orifices in fluid flow communication with the chamber, the volume of the chamber varying as a function of a difference between the flow rate of the wastewater entering the chamber and the flow rate of the wastewater discharged therefrom and increasing when the flow rate of the wastewater entering the chamber is greater than the biofiltering capacity of the peat. The discharge orifices each have a dimension selected so that the wastewater discharged from the chamber flows trough the bed of peat at a flow rate substantially equal to the biofiltering capacity of the peat when the flow rate of the wastewater entering the chamber is equal to or greater than the biofiltering capacity.

In a particularly preferred embodiment, the fluid flow control unit comprises an elongated, horizontally extending receptacle having upper and lower walls formed of a flexible material, the lower wall being provided with the aforesaid orifices and lying on the bed of peat. The chamber is defined between the upper and lower walls with the upper wall being movable towards or away from the lower wall in response to a decrease or increase in the volume of the chamber. The receptacle further has a feed inlet in-fluid flow communication with the inlet means for feeding the wastewater into the chamber. Preferably, the feed inlet is disposed at one end of the receptacle and wherein the lower and upper walls each have a predetermined width and the orifices are formed in the lower wall at predetermined locations, the width and locations being selected so as to cause the wastewater discharged through each orifice to flow at a substantially uniform flow rate. The orifices are generally circular and each have a diameter ranging preferably from about 2 to about 8 mm. For example, when the peat used is sphagnum peat having a biofiltering capacity of about 20 l/hr, the orifices each have a diameter of about 6 mm. When using sphagnum peat having a biofiltering capacity of about 22 l/hr, the orifices each have a diameter of about 5 mm. In the case of sphagnum peat having a biofiltering capacity of about 24 l/hr, the orifices each have a diameter of about 3 mm.

According to another preferred embodiment, the fluid flow control system comprises first and second fluid flow control units with the first unit being disposed on top of the second unit, the first fluid flow control unit being adapted to control the flow rate of the wastewater discharged therefrom and the second fluid flow control unit adapted to receive the wastewater discharged from the first unit and cause the wastewater to flow throughout substantially the entire bed of peat.

Preferably, the first fluid flow control unit has a chamber of variable volume in fluid flow communication with the inlet means and a plurality of spaced-apart discharge orifices in fluid flow communication with the chamber, the volume of the chamber varying as a function of a difference between the flow rate of the wastewater entering the chamber and the flow rate of the wastewater discharged therefrom and increasing when the flow rate of the wastewater entering the chamber is greater than the biofiltering capacity of the peat. The discharge orifices each have a dimension selected so that the wastewater discharged from the chamber flows though the bed of peat at a flow rate substantially equal to the biofiltering capacity of the peat when the flow rate of the wastewater entering the chamber is equal to or greater than the biofiltering capacity.

In a particularly preferred embodiment, the first fluid flow control unit comprises an elongated horizontally extending receptacle having upper and lower walls formed of a flexible material, the lower wall being provided with the aforesaid orifices and lying on the second fluid control unit. The chamber is defined between the upper and lower walls with the upper wall being movable towards or away from the lower wall in response to a decrease or increase in the volume of the chamber. The receptacle farther has a feed inlet in fluid flow communication with the inlet means for feeding the wastewater into the chamber.

According to a further preferred embodiment, the second fluid flow control unit comprises an elongated, horizontally extending porous membrane having upper and lower surfaces with the lower surface contacting the peat, the lower wall of the receptacle lying on the upper surface of the membrane. The membrane is capable of spreading the flow of the wastewater discharged from the receptacle as the wastewater flows through the membrane from the upper surface to the lower surface, and into the bed of peat. Preferably, the membrane is a multilayered membrane comprising upper and lower layers formed of non-woven fibers and each having a predetermined density, and an intermediate layer disposed between the upper and lower layers and formed of the non-woven fibers, the intermediate layer having a density less than the predetermined density. The upper and lower layers each have a plurality of spaced-apart apertures extending therethrough and formed, for example, by piercing the upper and lower layers with needles.

According to still a further preferred embodiment, the housing has a bottom opening defining the outlet means and a metal grating covers the bottom opening to support the bed of peat inside the housing while enabling the treated wastewater to flow through the bottom opening.

According to yet another preferred embodiment, the biofiltering device further includes sampling means enabling a sample of the treated wastewater to be collected for analysis. Preferably, the sampling means comprise a horizontal tray-like member disposed inside the housing adjacent a sidewall thereof and the bottom opening, and a guide member connected to the tray-like member and extending through an aperture formed in the sidewall. The tray-like member has a main fluid-receiving surface extending along an inclined plane for causing drops of the treated wastewater received on the main surface to flow in a direction towards the sidewall and the guide member has a guide channel arranged to receive the drops of treated wastewater from the main surface for guiding the drops through the apertures and exteriorly of said housing. The tray-like member preferably has two secondary fluid-receiving surfaces disposed opposite one another and each extending along an inclined plane for causing drops of treated wastewater received on the secondary surfaces to flow in a direction towards the main surface.

The biofiltering device according to the invention enables one to efficiently treat incoming wastewater irrespective of the flow rate thereof.

BRIEF DESCRIPTION OF THE DRAWINGS

Further features and advantages of the invention will become more readily apparent from the following description of preferred embodiments as illustrated by way of examples in the accompanying drawings, in which.

DESCRIPTION OF PREFERRED EMBODIMENTS

Figure 1:
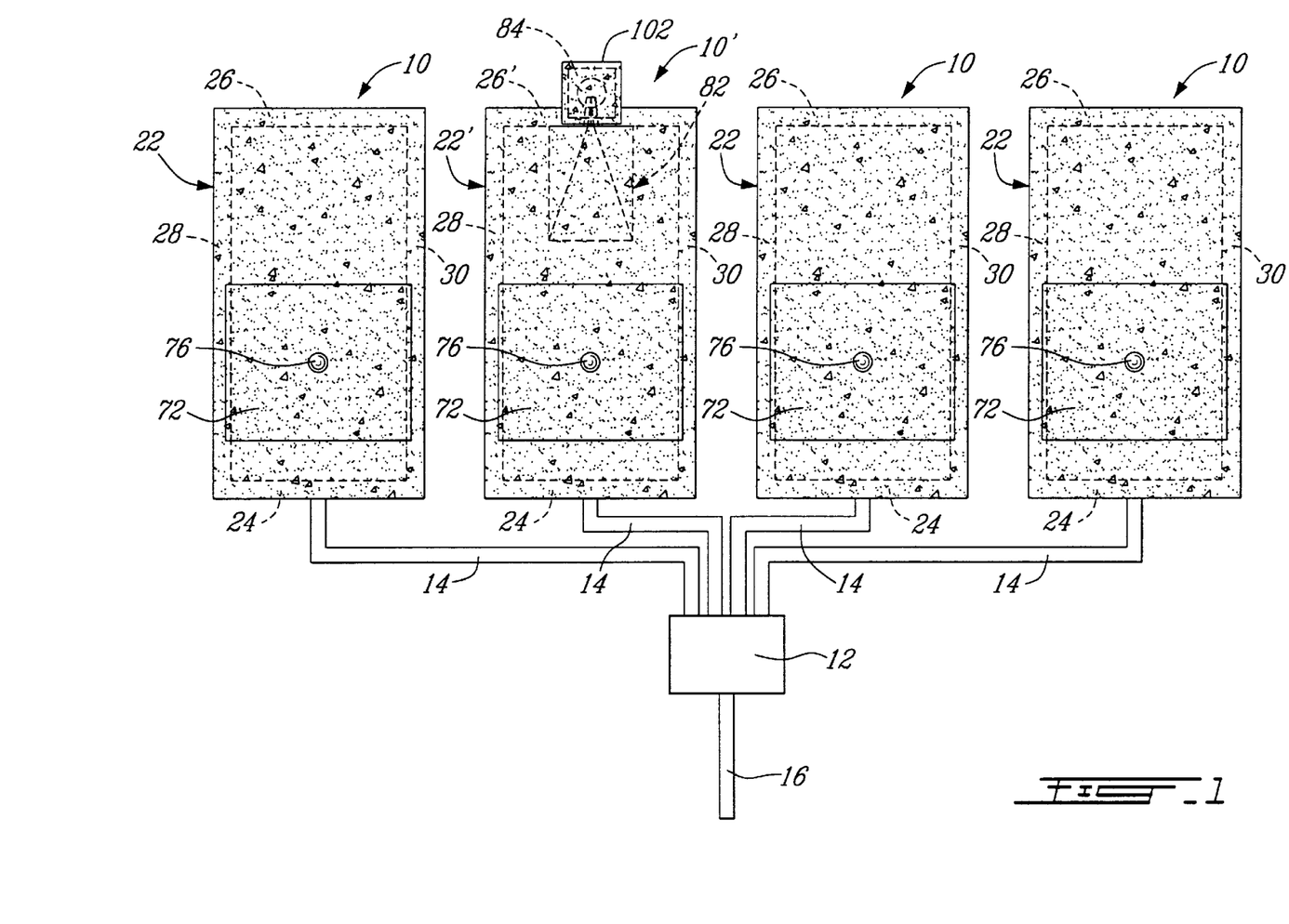
FIG. 1 is a top plan view illustrating a plurality of biofiltering devices according to a preferred embodiment of the invention, arranged downstream of a distributor box in fluid flow communication with a septic tank (not shown), for treating the wastewater discharged from the septic tank.

FIG. 1 shows a plurality of biofiltering devices 10,10' arranged downstream of a distributor box 12 and connected thereto by means of conduits 14. The distribution box 12 is connected by conduit 16 to a dosing chamber (not shown) in fluid flow communication with a septic tank (also not shown). The devices 10,10' serve to treat the wastewater discharged from the septic tank.

Figure 2:
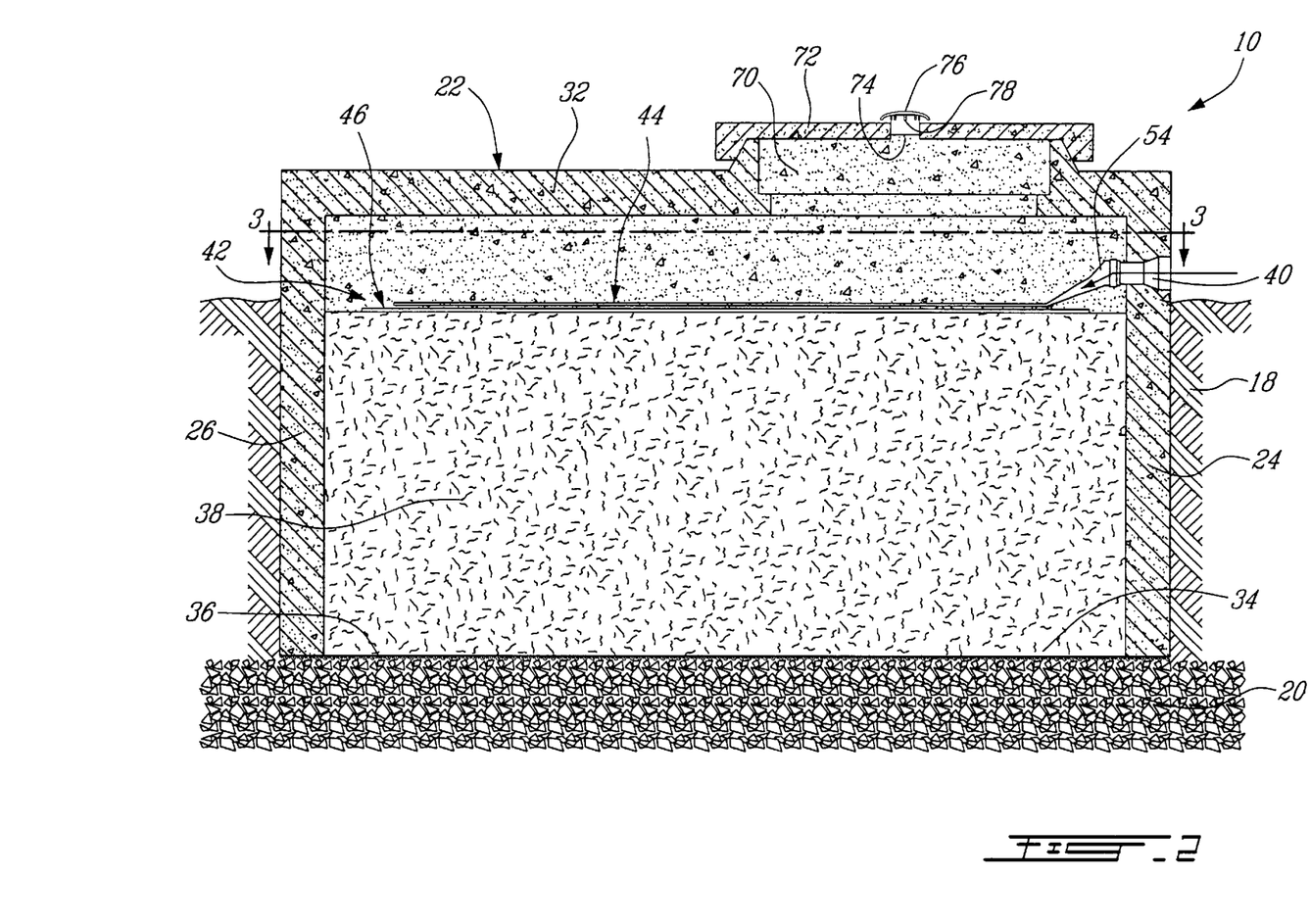
FIG. 2 is a sectional view of one of the biofiltering devices shown in FIG. 1.
Figure 3:
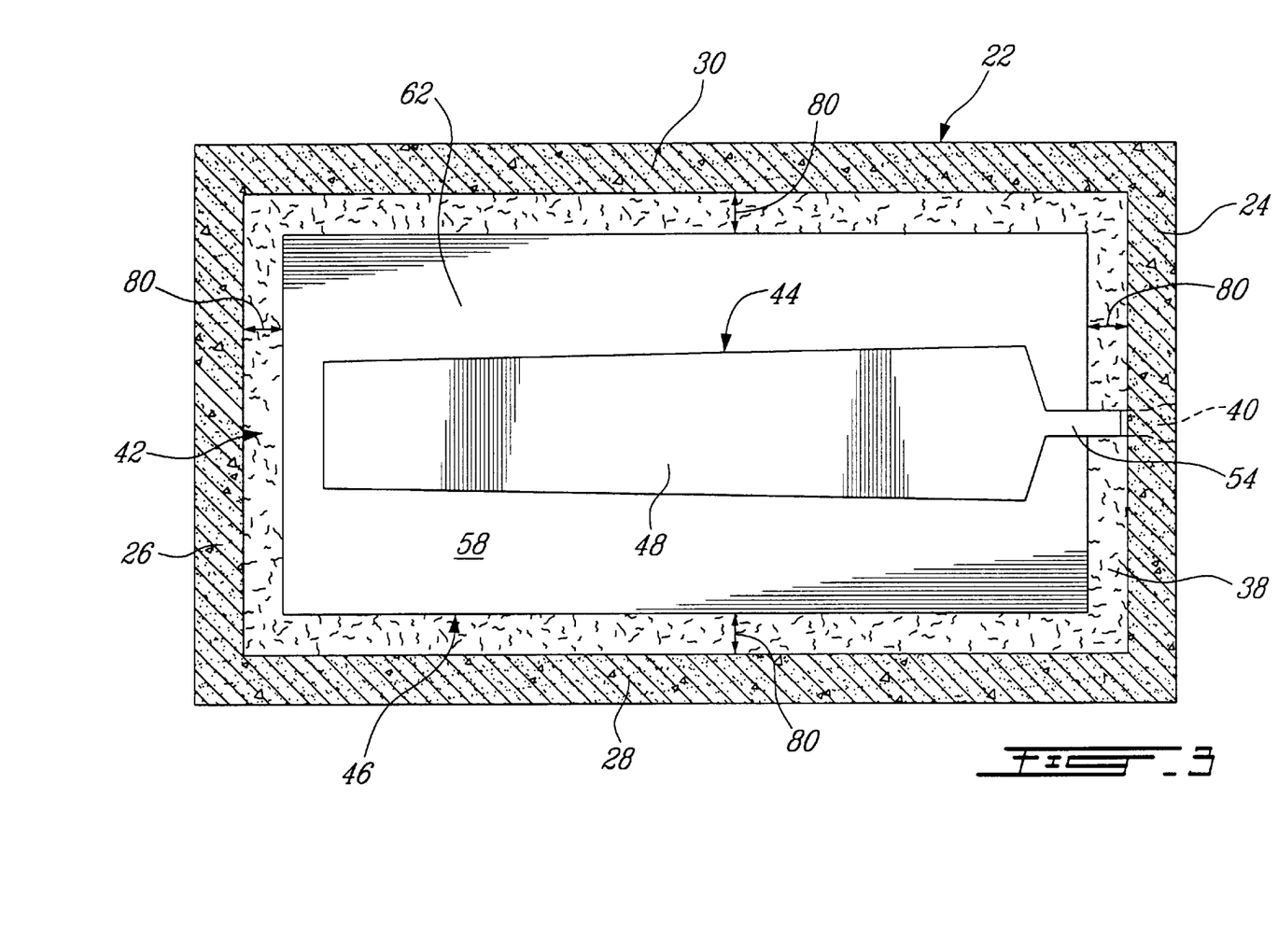
FIG. 3 is a sectional view taken along line 3—3 of FIG. 2.

As shown in FIGS. 2 and 3, each biofiltering device 10 is disposed in a hole dug in the ground 18 and rests on a bed of gravel stones 20. The device 10 comprises a housing 22 having four sidewalls 24, 26, 28 and 30 and a topwall 32 which are integral with one another and formed of concrete. The housing 22 further has a bottom opening 34 which is covered with a metal grating 36 supporting a bed of peat 38 inside the housing. The peat defines a biofiltering medium having a predetermined biofiltering capacity. The sidewall 24 is provided with an inlet 40 connected to the conduit 14 (shown in FIG. 1) for feeding into the housing 22 the wastewater to be treated. A fluid flow control system 42 in fluid flow communication with the inlet 40 is arranged on top of the bed of peat 38 for distributing the wastewater through the bed of peat 38 in a manner such that when the wastewater enters the system 42 at a flow rate equal to or greater than the biofiltering capacity of the peat, the wastewater discharged from the system flows throughout substantially the entire bed of peat 38 at a flow rate substantially equal to the biofiltering capacity.

Figure 4:
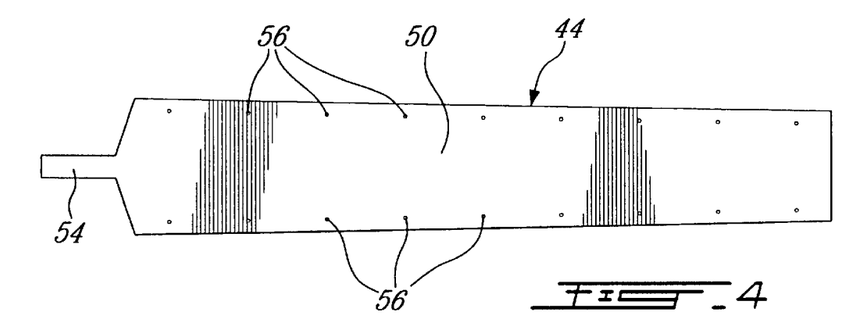
FIG. 4 is a bottom plan view of a receptacle used as a first fluid flow control unit in the biofiltering device shown in FIG. 2.
Figure 5:
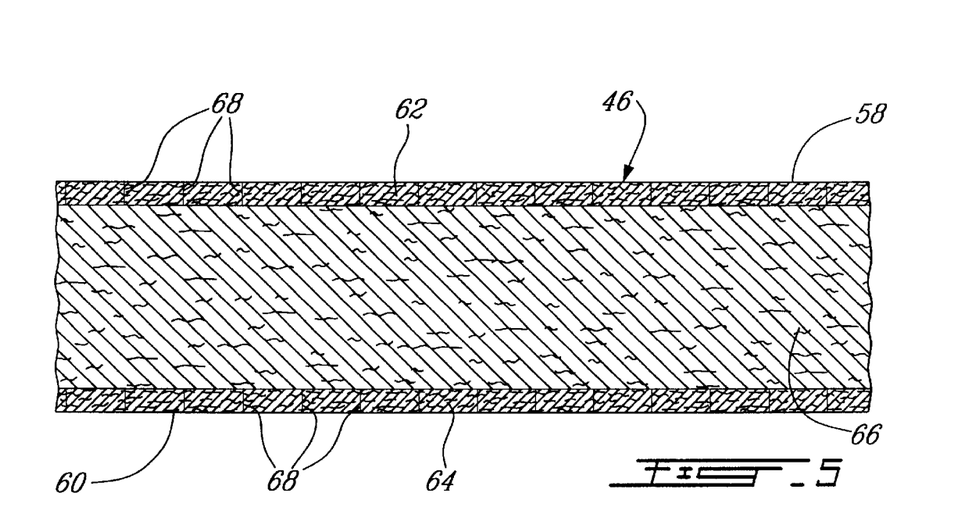
FIG. 5 is a partial sectional view of a membrane used as a second fluid flow control unit in the biofiltering device shown in FIG. 2.

The fluid flow control system 42 comprises an elongated, horizontally extending receptacle 44 and an elongated, horizontally extending porous membrane 46, the receptacle 44 being disposed on top of the membrane 46. As best shown in FIGS. 3–5, the receptacle 44 has an upper wall 48 and a lower wall 50 formed of a flexible material with a chamber 52 (shown in FIG. 6) of variable volume defined therebetween. The receptacle 44 firer has a feed inlet 54 connected to the inlet 40 for feeding the wastewater into the chamber 52. The lower wall 50 is provided with a plurality of spaced-apart discharge orifices 56 in fluid flow communication with the chamber 52 and facing the membrane 46. The volume of the chamber 52 varies as a function of the difference between the flow rate of the wastewater entering the chamber 52 and the flow rate of the wastewater discharged therefrom and increases when the flow rate of the wastewater entering the chamber 52 is greater than the biofiltering capacity of the peat. The upper wall 48 thus moves towards or away from the lower wall 50 in response to a decrease or increase in the volume of the chamber 52. The discharge orifices 56 each have a dimension selected so that the wastewater discharged from the chamber 52 and flowing through the membrane 46 flows through the bed of peat 38 at a flow rate substantially equal to the biofiltering capacity of the peat when the flow rate of the wastewater entering the chamber 52 is equal to or greater than the biofiltering capacity. The walls 48 and 50 of the receptacle 44 have a width which decreases from the inlet end to the opposite end and the orifices 56 are disposed adjacent the longitudinal edges of the wall 50, thereby causing the wastewater discharged through each orifice 56 to flow at a substantially uniform flow rate.

The membrane 46 has upper and lower surfaces 58,60 with the lower surface 60 contacting the peat. The lower wall 50 of the receptacle 44 lies on the upper surface 58 of the membrane. The membrane 46 is a multilayered membrane comprising upper and lower layers 62,64 formed of non-woven polypropylene fibers and having a density of about 0.1 g/cm$^3$, and an intermediate layer 66 also formed of non-woven polypropylene fibers, but having a density of about 0.05 g/cm$^3$. The upper and lower layers 62,64 each have a plurality of spaced-apart apertures 68 extending therethrough and formed by piercing the layers 62,64 with needles. The membrane 46 is capable of spreading the flow of wastewater discharged from the receptacle 44 as the wastewater flows through the membrane from the upper surface 48 to the lower surface 50, and into the bed of peat 38. Thus, the receptacle 44 constitutes a first fluid flow control unit adapted to control the flow rate of the wastewater discharged therefrom, whereas the membrane 46 constitutes a second fluid flow control unit adapted to receive the wastewater discharged from the receptacle 44 and cause the wastewater to flow throughout substantially the entire bed of peat 38. The treated wastewater is discharged from the device 10 through the bottom opening 34 and flows through the metal grating 36. The peat filters suspended particles of organic and inorganic materials present in the wastewater. The anti-microbial properties of the peat combined with those of fungi and actinomycetes present in the peat contribute to eliminating fecal coliforms.

The membrane 46 is optional. Where use is not made of such a membrane 46, the receptacle 44 lies directly on the bed of peat 38.

Means are provided for aerating the peat. As shown in FIG. 2, the topwall 32 of the housing 22 has an aperture 70 which is closed with a removable cover 72 provided with an orifice 74. A removable cap 76 having a plurality of vent orifices 78 is disposed in the orifice 74. The aperture 70 and orifices 74,78 define an air inlet permitting atmospheric air to enter into the housing 22. In addition, as shown in FIG. 3, the membrane 46 has lateral and end edges which are each spaced from a respective sidewall 24,26,28,30 by a respective gap 80. The gaps 80 also permit aeration of the peat.

Figure 6:
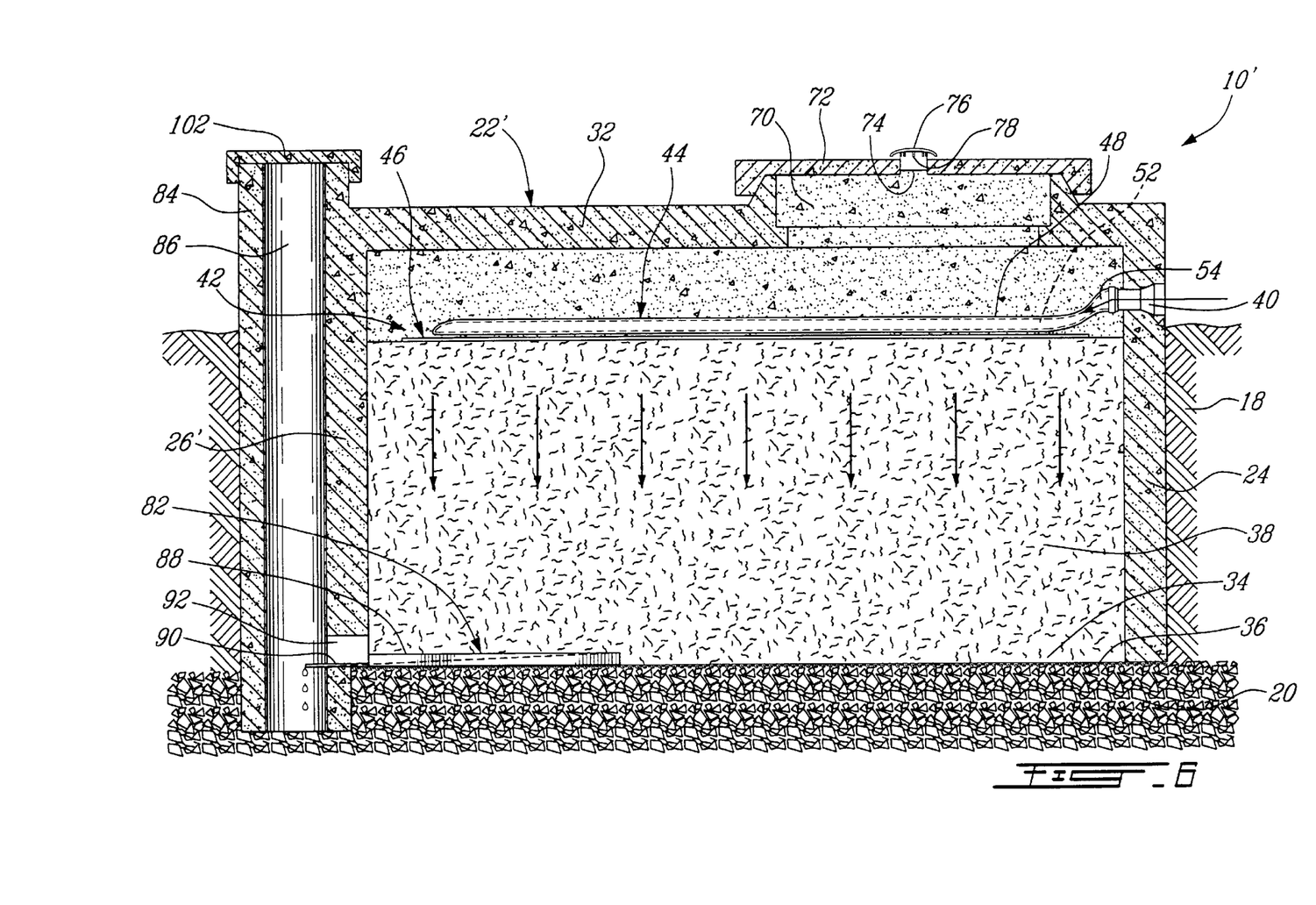
FIG. 6 is a sectional view of another one of the biofiltering devices illustrated in FIG. 1, shown provided with a sampling system enabling a sample of the treated wastewater to be collected for analysis.
Figure 7:
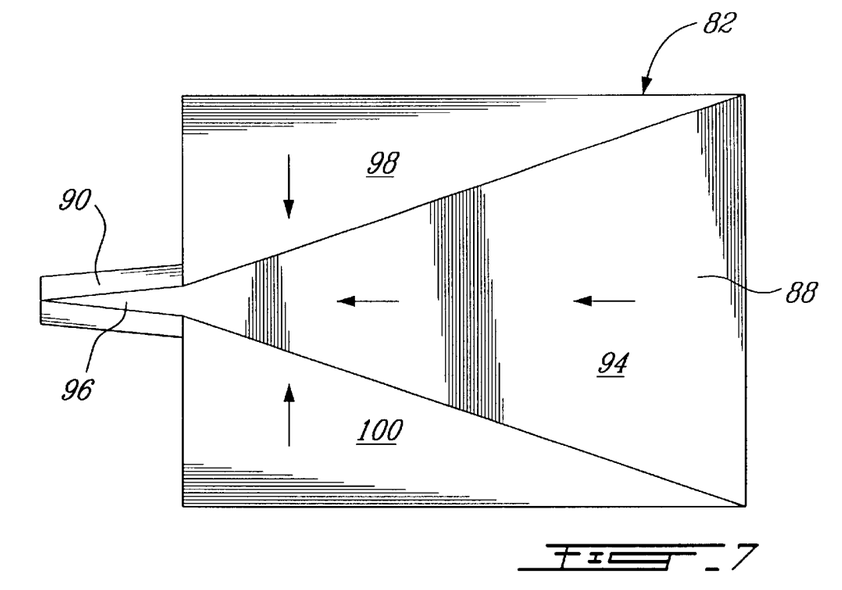
FIG. 7 is a top plan view of the sampling system used in the biofiltering device shown in FIG. 6.
Figure 8:
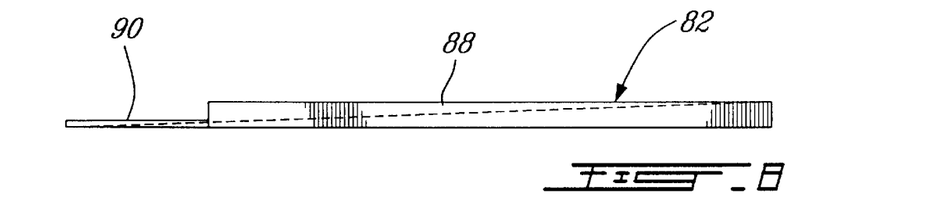
FIG. 8 is a side elevational view of the sampling system shown in FIG. 7.
Figure 9:
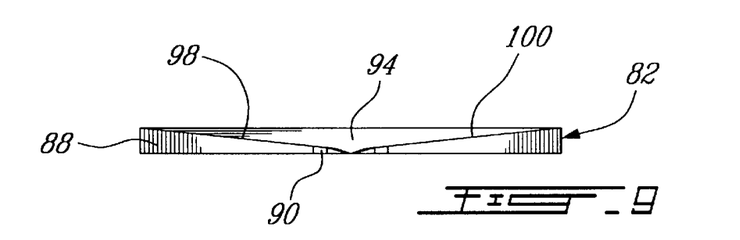
FIG. 9 is an end elevational view of the sampling system shown in FIG. 7, taken from the left-hand side of FIG. 7.

The biofiltering device 10' shown in FIG. 1 and illustrated in more detail in FIG. 6 is similar to the device 10, except that the device 10' is provided with a sampling system 82 enabling a sample of the treated wastewater to be collected for analysis and the housing 22' has a sidewall 26' provided with a column 84 having sampling hole 86. The sampling system 82 comprises a horizontal tray-like member 88 disposed adjacent the sidewall 26' and resting on the metal grating 36, and a guide member 90 connected to the tray-like member 88 and extending through an aperture 92 formed in the sidewall 26'. As shown in FIGS. 7–9, the tray-like member 88 has a main fluid-receiving surface 94 extending along an inclined plane for causing drops of the treated wastewater received on the main surface 94 to flow in a direction towards the sidewall 26' (shown in FIGS. 1 and 6). The guide member 90, on the other hand, has a guide channel 96 arranged to receive the drops of the treated wastewater from the main surface 94 for guiding the drops through the aperture 92 and into the sampling hole 86. The tray-like member 88 further has two secondary fluid-receiving surfaces 98,100 disposed opposite one another and each extending along an inclined plane for causing drops of treated wastewater received on the secondary surfaces 98,100 to flow in a direction towards the main surface 94.

The sampling hole 86 is closed with a removable cover 102. Removal of the cover 102 enables one to gain access to the sampling hole 86 and, by using an elongated spoon-shaped sampling instrument, one can take a sample of the treated wastewater dripping into the hole 86 for analysis of the sample.

As it is apparent, the biofiltering devices 10 and 10' enable one to efficiently treat incoming wastewater irrespective of the flow rate thereof.

I claim:

1. A biofiltering device for treating wastewater, comprising:

a housing having inlet means for receiving the wastewater to be treated and outlet means for discharging the treated wastewater;

a bed of peat disposed inside said housing between said inlet and outlet means, said peat defining a biofiltering medium having a predetermined biofiltering capacity;

means for aerating said peat; and a fluid flow control system arranged over said bed of peat and in fluid flow communication with said inlet means, and adapted for distributing the wastewater through said bed of peat in a manner such that when the wastewater enters said system at a flow rate greater than the biofiltering capacity of said peat, the wastewater discharged from said system flows through said bed of peat at a flow rate no greater than said biofiltering capacity.

2. A biofiltering device as claimed in claim 1, wherein said fluid flow control system comprises a fluid flow control unit having a chamber of variable volume in fluid flow communication with said inlet means and a plurality of spaced-apart discharge orifices in fluid flow communication with said chamber, the volume of said chamber varying as a function of a difference between the flow rate of the wastewater entering said chamber and the flow rate of the wastewater discharged therefrom and increasing when the flow rate of the wastewater entering said chamber is greater than said biofiltering capacity, and wherein said discharge orifices each have a dimension selected so that the wastewater discharged from said chamber flows through said bed of peat at a flow rate substantially equal to said biofiltering capacity when the flow rate of the wastewater entering said chamber is equal to or greater than said biofiltering capacity.

3. A biofiltering device as claimed in claim 2, wherein said fluid flow control unit comprises an elongated, horizontally extending receptacle having upper and lower walls formed of a flexible material, said lower wall being provided with said orifices and lying on said bed of peat, and wherein said chamber is defined between said upper and lower walls with said upper wall being movable towards or away from said lower wall in response to a decrease or increase in the volume of said chamber, said receptacle further having a feed inlet in fluid flow communication with said inlet means for feeding the wastewater into said chamber.

4. A biofiltering device as claimed in claim 3, wherein said feed inlet is disposed at one end of said receptacle and wherein said lower and upper walls each have a predetermined width and said orifices are formed in said lower wall at predetermined locations, said width and said locations being selected so as to cause the wastewater discharged through each said orifice to flow at a substantially uniform flow rate.

5. A biofiltering device as claimed in claim 4, wherein the width of each said upper and lower walls decreases from said one end of said receptacle to an end opposite said one end, and wherein said orifices are disposed adjacent longitudinal edges of said lower wall.

6. A biofiltering device as claimed in claim 4, wherein said orifices are circular and each have a diameter ranging from about 2 to about 8 mm.

7. A biofiltering device as claimed in claim 6, wherein said peat is sphagnum peat having a biofiltering capacity of about 20 l/hr and wherein said orifices each have a diameter of about 6 mm.

8. A biofiltering device as claimed in claim 6, wherein said peat is sphagnum peat having a biofiltering capacity of about 22 l/hr and wherein said orifices each have a diameter of about 5 mm.

9. A biofiltering device as claimed in claim 6, wherein said peat is sphagnum peat having a biofiltering capacity of about 24 l/hr and wherein said orifices each have a diameter of about 3 mm.

10. A biofiltering device as claimed in claim 1, wherein said fluid flow control system comprises first and second fluid flow control units with the first unit being disposed on top of the second unit, said first fluid flow control unit being adapted to control the flow rate of the wastewater discharged therefrom and said second fluid flow control unit adapted to receive the wastewater discharged from said first unit and cause the wastewater to flow throughout substantially the entire bed of peat.

11. A biofiltering device as claimed in claim 10, wherein said first fluid flow control unit has a chamber of variable volume in fluid flow communication with said inlet means and a plurality of spaced-apart discharge orifices in fluid flow communication with said chamber, the volume of said chamber varying as a function of a difference between the flow rate of the wastewater entering said chamber and the flow rate of the wastewater discharged therefrom and increasing when the flow rate of the wastewater entering said chamber is greater than said biofiltering capacity, and wherein said discharge orifices each have a dimension selected so that the wastewater discharged from said chamber flows through said bed of peat at a flow rate substantially equal to said biofiltering capacity when the flow rate of the wastewater entering said chamber is equal to or greater than said biofiltering capacity.

12. A biofiltering device as claimed in claim 11, wherein said first fluid flow control unit comprises an elongated, horizontally extending receptacle having upper and lower walls formed of a flexible material, said lower wall being provided with said orifices and lying on said second fluid control unit, and wherein said chamber is defined between said upper and lower walls with said upper wall being movable towards or away from said lower wall in response to a decrease or increase in the volume of said chamber, said receptacle further having a feed inlet in fluid flow communication with said inlet means for feeding the wastewater into said chamber.

13. A biofiltering device as claimed in claim 12, wherein said feed inlet is disposed at one end of said receptacle and wherein said upper and lower walls each have a predetermined width and said orifices are formed in said lower wall at predetermined locations, said width and said locations being selected so as to cause the wastewater discharged through each said orifice to flow at a substantially uniform flow rate.

14. A biofiltering device as claimed in claim 13, wherein the width of each said upper and lower walls decreases from said one end of said receptacle to an end opposite said one end, and wherein said orifices are disposed adjacent longitudinal edges of said lower wall.

15. A biofiltering device as claimed in claim 13, wherein said orifices are circular and each have a diameter ranging from about 2 to about 8 mm.

16. A biofiltering device as claimed in claim 15, wherein said peat is sphagnum peat having a biofiltering capacity of about 20 l/hr and wherein said orifices each have a diameter of about 6 mm.

17. A biofiltering device as claimed in claim 15, wherein said peat is sphagnum peat having a biofiltering capacity of about 22 l/hr and wherein said orifices each have a diameter of about 5 mm.

18. A biofiltering device as claimed in claim 15, wherein said peat is sphagnum peat having a biofiltering capacity of about 24 l/hr and wherein said orifices each have a diameter of about 3 mm.

19. A biofiltering device as claimed in claim 12, wherein said second fluid flow control unit comprises an elongated, horizontally extending porous membrane having upper and lower surfaces with the lower surface contacting said peat, said lower wall of said receptacle lying on the upper surface of said membrane, and wherein said membrane is capable of spreading the flow of the wastewater discharged from said receptacle as said wastewater flows through said membrane from said upper surface to said lower surface, and into said bed of peat.

20. A biofiltering device as claimed in claim 19, wherein said membrane is a multilayered membrane comprising upper and lower layers formed of non-woven fibers and each having a predetermined density, and an intermediate layer disposed between said upper and lower layers and formed of said non-woven fibers, said intermediate layer having a density less than said predetermined density, and wherein said upper and lower layers each have a plurality of spaced-apart apertures extending therethrough.

21. A biofiltering device as claimed in claim 20, wherein said non-woven fibers are made of polypropylene and wherein said upper and lower layers each have a density of about 0.1 g/cm$^3$ and said intermediate layer has a density of about 0.05 g/cm$^3$.

22. A biofiltering device as claimed in claim 19, wherein said housing has sidewalls and a topwall provided within an air inlet permitting atmospheric air to enter into said housing, and wherein said membrane has lateral and end edges each spaced from a respective sidewall by a respective gap, said air inlet and said respective gap defining said means for aerating said peat.

23. A biofiltering device as claimed in claim 1, wherein said housing has a bottom opening defining said outlet means and wherein a metal grating covers said bottom opening to support said bed of peat inside said housing while enabling the treated wastewater to flow through said bottom opening.

24. A biofiltering device as claimed in claim 23, further including sampling means enabling a sample of the treated wastewater to be collected for analysis.

25. A biofiltering device as claimed in claim 24, wherein said sampling means comprise a horizontal member disposed inside said housing adjacent a sidewall thereof and said bottom opening, and a guide member connected to said horizontal member and extending through an aperture formed in said sidewall, and wherein said horizontal member has a main fluid-receiving surface extending along an inclined plane for causing drops of the seated wastewater received on said main surface to flow in a direction towards said sidewall and said guide member has a guide channel arranged to receive said drops of treated wastewater from said main surface for guiding said drops through said aperture and exteriorly of said housing.

26. A biofiltering device as claimed in claim 25, wherein said horizontal member has two secondary fluid-receiving surfaces disposed opposite one another and each extending along an inclined plane for causing drops of treated wastewater received on said secondary surfaces to flow in a direction towards said main surface.

27. A biofiltering device as claimed in claim 25, wherein said horizontal member rests on said metal grating.

28. A biofiltering device for treating wastewater, comprising:
   a housing having inlet means for receiving the wastewater to be treated and outlet means for discharging the treated wastewater;
   a bed of peat disposed inside said housing between said inlet and outlet means, said peat defining a biofiltering medium having a predetermined biofiltering capacity;
   means for aerating said peat; and
   a fluid flow control system arranged over said bed of peat and in fluid flow communication with said inlet means, and adapted for distributing the wastewater through said bed of peat in a manner such that when the wastewater enters said system at a flow rate greater than the biofiltering capacity of said peat, the wastewater discharged from said system flows through said bed of peat at a flow rate no greater than said biofiltering capacity, wherein said fluid flow control system comprises a fluid control unit having a chamber in fluid flow communication with said inlet means and a plurality of spaced-apart discharge orifices in fluid flow communication with said chamber, said chamber having a volume sufficient to permit accumulation of wastewater when the wastewater enters said chamber at a flow rate greater than said biofiltering capacity, and wherein said discharge orifices are adapted to discharge wastewater from said chamber to said bed of peat at a flow rate no greater than said biofiltering capacity when the flow rate of the wastewater entering said chamber is greater than said biofiltering capacity.

29. A biofiltering device for treating wastewater, comprising:
   a housing having inlet means for receiving the wastewater to be treated and outlet means for discharging the treated wastewater;
   a bed of peat disposed inside said housing between said inlet and outlet means, said peat defining a biofiltering medium having a predetermined biofiltering capacity;
   means for aerating said peat; and
   a fluid flow control system arranged over said bed of peat and in fluid flow communication with said inlet means, and adapted for distributing the wastewater through said bed of peat in a manner such that when the wastewater enters said system at a flow rate greater than the biofiltering capacity of said peat, the wastewater discharged from said system flows through said bed of peat at a flow rate no greater than said biofiltering capacity, wherein said fluid flow control system comprises first and second fluid flow control units with the first unit being disposed on top of the second unit, said first fluid flow control unit being adapted to control the flow rate of wastewater discharged therefrom and said second fluid flow control unit adapted to receive the wastewater discharged from said first unit and cause the wastewater to flow throughout substantially the entire bed of peat, and wherein said first fluid flow unit has a chamber in fluid flow communication with said inlet means and a plurality of spaced-apart discharge orifices in fluid flow communication with said chamber, said chamber having a volume sufficient to permit accumulation of wastewater when the wastewater enters said chamber at a flow rate greater than said biofiltering capacity, said discharge orifices being adapted to discharge wastewater from said chamber to said second fluid flow control unit at a flow rate no greater than said biofiltering capacity when the flow rate of the wastewater entering said chamber is greater than said biofiltering capacity.

* * * * *